United States Patent [19]

Tanaka et al.

[11] Patent Number: 4,735,563
[45] Date of Patent: Apr. 5, 1988

[54] APPARATUS FOR SEALING A SEMICONDUCTOR ELEMENT IN A RESIN

[75] Inventors: Minoru Tanaka; Tethuya Uchida; Toru Kidera, all of Fukuoka, Japan

[73] Assignee: Mitsubishi Denki Kabushiki Kaisha, Japan

[21] Appl. No.: 56,764

[22] Filed: Jun. 2, 1987

[30] Foreign Application Priority Data

| Jun. 5, 1986 | [JP] | Japan | 51-132136 |
| Jun. 5, 1986 | [JP] | Japan | 51-132137 |
| Jul. 10, 1986 | [JP] | Japan | 51-107068[U] |
| Jul. 10, 1986 | [JP] | Japan | 51-107069[U] |
| Jan. 16, 1987 | [JP] | Japan | 52-8399 |
| Feb. 13, 1987 | [JP] | Japan | 52-32024 |
| Feb. 18, 1987 | [JP] | Japan | 52-23105[U] |
| Feb. 25, 1987 | [JP] | Japan | 52-41846 |
| Feb. 27, 1987 | [JP] | Japan | 52-29111[U] |

[51] Int. Cl.$^4$ .................. B29C 45/02; B29C 45/14
[52] U.S. Cl. .................................. 425/116; 164/312;
222/383; 222/385; 425/127; 425/129 R;
425/544; 425/129.1
[58] Field of Search ............... 425/110, 116, 129 R,
425/398, 542, 557, 544, 561, 567, 574, 451.5,
127, 592, 593, 562; 264/272.17; 164/312;
222/383, 385

[56] References Cited

U.S. PATENT DOCUMENTS

| 963,833 | 7/1910 | McLennan | 425/451.5 |
| 2,369,277 | 2/1945 | Campbell | 164/312 |
| 4,511,317 | 4/1985 | Bandoh | 425/544 |
| 4,525,318 | 6/1985 | Reil et al. | 425/116 |

FOREIGN PATENT DOCUMENTS 2554269  6/1977  Fed. Rep. of Germany ...... 425/562

Primary Examiner—Willard Hoag
Attorney, Agent, or Firm—Leydig, Voit & Mayer

[57] ABSTRACT

A seating apparatus for sealing a semiconductor element in a resin has a plunger which injects a resin pellet into the cavities of an upper and lower mold. The plunger is driven by a reciprocating mechanism through a flexible transmission member so that the directions of movement of the plunger and the reciprocating mechanism need not be parallel. In preferred embodiments, the reciprocating mechanism is a ball screw mechanism which is driven by a servomotor, and the flexible transmission member is a roller chain which is slidably disposed within a lower mold. The lower mold may be longitudinally divided into a plurality of sections which are detachably secured to one another to enable easy manufacture and disassembly. A ventilating mechanism for passing cooling air along the length of the roller chain during molding may be provided to prevent the roller chain from being damaged by the heat of molding.

19 Claims, 5 Drawing Sheets

FIG. 8(a)
FIG. 7
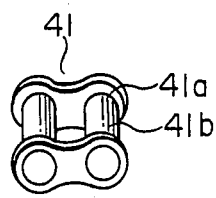
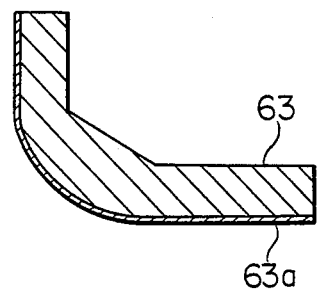
FIG. 8(b)
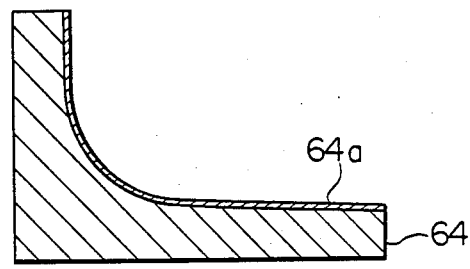
FIG. 9
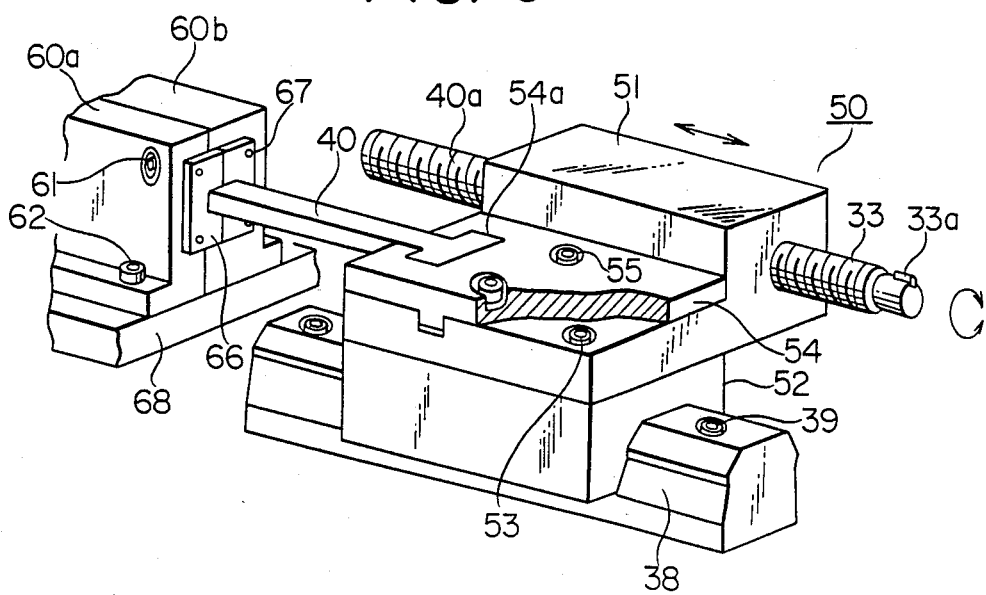

APPARATUS FOR SEALING A SEMICONDUCTOR ELEMENT IN A RESIN

BACKGROUND OF THE INVENTION

This invention relates to a sealing apparatus for sealing semiconductor elements in a resin, and more particularly to an improved sealing apparatus which is compact and easy to maintenance.

FIG. 1 illustrates a conventional sealing apparatus for sealing a semiconductor element in a resin which was disclosed in Japanese Laid-Open Utility Model Application No. 59-9538. As shown in the drawing. the conventional sealing apparatus has a stationary lower platen 1 which rigidly supports four vertical guide rods 2. An upper platen 3 which is parallel to and confronts the lower platen 1 is secured to the upper ends of the guide rods 2. The guide rods 2 slidably support a movable platen 5 which can be moved up and down the guide rods 2 by an unillustrated reciprocating link mechanism which is driven by a servomotor 4 which is secured to the lower platen 1. The movable platen 5 rigidly supports a lower mold 6, and the upper platen 3 rigidly supports an upper mold 7 which confronts the lower mold 6. By moving the movable platen 5 vertically, the lower mold 6 can be brought into contact with the upper mold 7. The lower mold 6 and upper mold 7 have unillustrated cavities formed in the confronting surfaces thereof in which a semiconductor element is disposed during molding. The upper platen 3 and the upper mold 7 have axially-aligned through holes 3a and 7a, respectively, which are formed therein through which a resin for sealing a semiconductor element can be inserted into the molds 6 and 7.

Four parallel supports 8 (two of which are shown in the figure) extend vertically from the upper surface of the upper platen 3, and a flat mounting plate 9 is rigidly supported by the upper ends thereof. The mounting plate 9 rigidly supports a servomotor 10 and rotatably supports a first gear 11 and a second gear 12 which mesh with one another. The first gear 11 is directly driven by servomotor 10, and the second gear 12 is driven by the first gear 11. The second gear 12 is secured to one end of a threaded shaft 13 which is rotatably supported by the mounting plate 9 and the upper platen 3. One side of a movable plate 14 is slidably supported by two of the supports 8, while the other side of the movable plate 14 has a threaded portion 14a formed therein which engages with the threaded shaft 13, so that when the threaded shaft 13 is rotated by the servomotor 10 through the gears 11 and 12, the movable plate 14 is caused to translate in the vertical direction. A plunger 15 for inserting a resin tablet 16 into the molds 6 and 7 is secured to the movable plate 14 and extends through the holes 3a and 7a formed in the upper platen 3 and the upper mold 7, respectively.

Sealing of a semiconductor element using this conventional apparatus is performed as follows. A semiconductor element to be sealed is disposed in the unillustrated mold cavity of the lower mold 6, and the movable platen 5 is then raised by servomotor 4 until the lower mold 6 contacts the upper mold 7. A resin tablet 16 is placed in the through hole 7a in the upper mold 7, and servomotor 10 is driven to rotate the threaded shaft 13 through the gears 11 and 12, causing the movable plate 14 to descend and press the plunger 15 into the upper mold 7. The plunger 15 injects the tablet 16 into the cavities in the upper mold 7 and the lower mold 6 in which the semiconductor element is disposed. The resin tablet 16 is normally a thermosetting resin and is heated and made to set by a plurality of unillustrated cartridge-type heaters which are embedded in the upper and lower molds, thereby sealing the semiconductor element within the resin.

This conventional apparatus has the drawback that since the plunger 15 is directly driven by the threaded shaft 13, the threaded shaft 13 must be maintained parallel to the plunger 15, and there are restrictions on the locations in which the mechanism for rotating the threaded shaft 13 can be disposed. As a result, it is difficult to achieve decreases in the size of the apparatus. Furthermore, in order to replace or repair the plunger 15, it is necessary to remove the mounting plate 9, the gears 11 and 12, and the movable plate 14 from the vertical supports 8 before extracting the plunger 15 from the upper mold 7. Accordingly, the maintenance and repair of the apparatus are time-consuming.

Also, if it desired to arrange a plurality plungers in parallel so as to simultaneously seal a plurality of semiconductor elements in corresponding molds, it is necessary to form a plurality of through holes 3a in the upper platen 3 for the plungers to pass through. As the through holes 3a weaken the upper platen 3, and as the upper platen 3 must be able to support the weight of a separate drive mechanism for each plunger, it is necessary to increase the thickness of the upper platen 3 in order to guarantee adequate strength, resulting in a considerable increase in the weight of the apparatus.

SUMMARY OF THE INVENTION

It is therefore an object of the present invention to provide a sealing apparatus for sealing a semiconductor element in a resin in which the direction of movement of a plunger and the direction of movement of a reciprocating mechanism for moving the plunger into and out of a mold need not be parallel with one another.

It is another object of the present invention to provide a sealing apparatus for semiconductor elements whose plunger and other parts requiring replacement can be easily removed from the apparatus.

It is yet another object of the present invention to provide a sealing apparatus for semiconductor elements which can be easily manufactured.

A sealing apparatus for semiconductor elements in accordance with the present invention employs a reciprocating mechanism to reciprocate a plunger which injects a resin pellet into a pair of confronting molds. The drive force of the reciprocating mechanism is transmitted to the plunger through a flexible transmission member which is connected between the reciprocating mechanism and the plunger and which is capable of transmitting a compressive or tensile force along a curved path. By curving the flexible transmission member, the directions of movement of the reciprocating mechanism and the plunger can be nonparallel to one another.

In preferred embodiments, the reciprocating mechanism comprises a ball screw mechanism which is driven by a servomotor and the flexible transmission member comprises a roller chain which is connected between the plunger and the nut of the ball screw mechanism.

The flexible transmission member is guided along a curved path between the plunger and the reciprocating mechanism by a guide member. In preferred embodiments, the guide member is a block-shaped member having a passageway formed therein, the flexible transmission member being slidably disposed within the passageway. The guide member may be a single member, or it may be longitudinally divided into two confronting sections which are detachably secured to one another and whose confronting surfaces form the sides of the passageway.

The passageway for the flexible transmission member may have replaceable linings secured to the inner surfaces thereof, the inner surfaces of the linings being in sliding contact with the flexible transmission member. Preferably, at least the inner surfaces of the replaceable linings are made of a ceramic material so as to increase the heat resistance and wear resistance of the linings.

In one preferred embodiment, the guide member has two parallel passageways formed therein, and a separate flexible transmission member is disposed within each passageway. The two flexible transmission members are connected to two separate plungers but to a single reciprocating mechanism which makes the two plungers reciprocate together and in parallel with one another.

The sealing apparatus may further comprise a ventilating mechanism for passing cooling air along the length of the flexible transmission member during molding to prevent its being damaged by heat.

BRIEF DESCRIPTION OF THE DRAWINGS

FIG. 7 is a perspective view of one link of the roller chain of FIG. 5.

FIGS. 8a and 8b are side views of the upper and lower linings, respectively, of FIG. 5, showing ceramic layers which are formed on their inner surfaces.

FIG. 9 is a perspective view of the nut assembly of the embodiment of FIG. 5.

In the figures, the same reference numerals indicate the same or corresponding parts.

DESCRIPTION OF THE PREFERRED EMBODIMENTS

Figure 1:
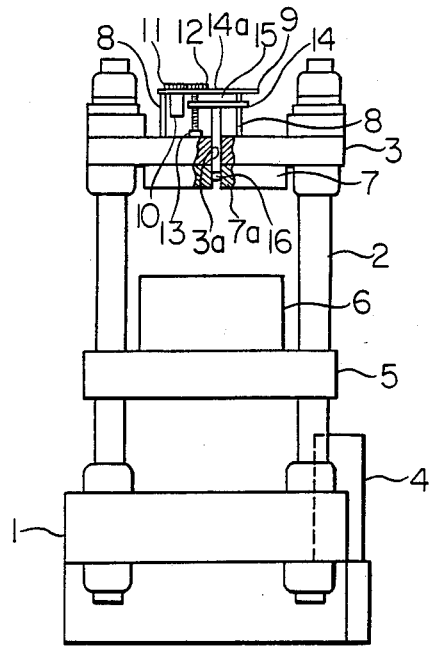
FIG. 1 is a cutaway front view of a conventional sealing apparatus for semiconductor elements.
Figure 2:
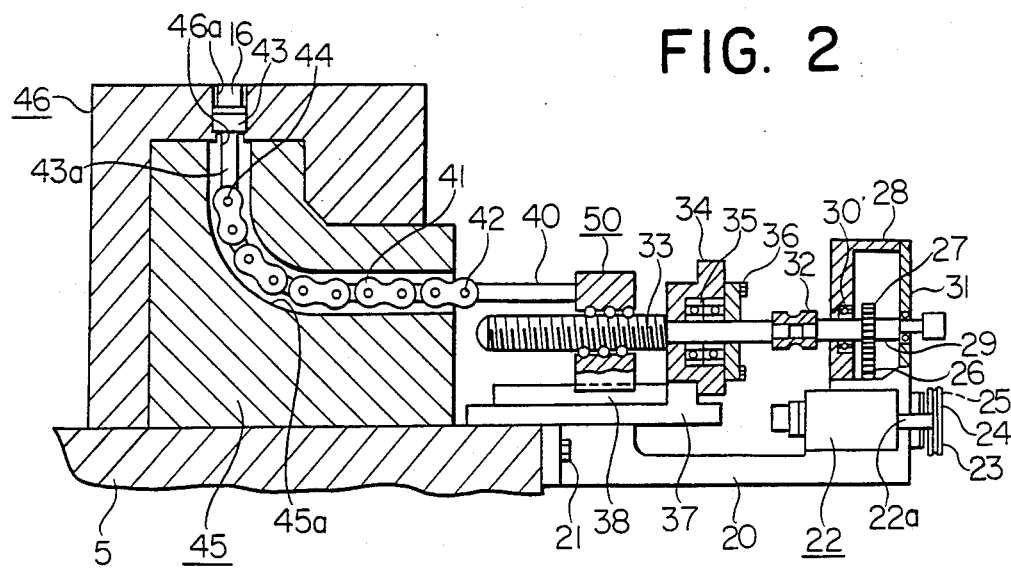
FIG. 2 is a longitudinal cross-sectional view of a portion of a first embodiment of a sealing apparatus in accordance with the present invention.
Figure 3:
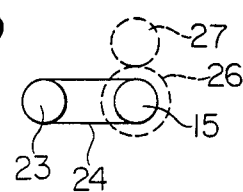
FIG. 3 is a schematic view illustrating a portion of the reciprocating mechanism of the embodiment of FIG. 1.
Figure 4:
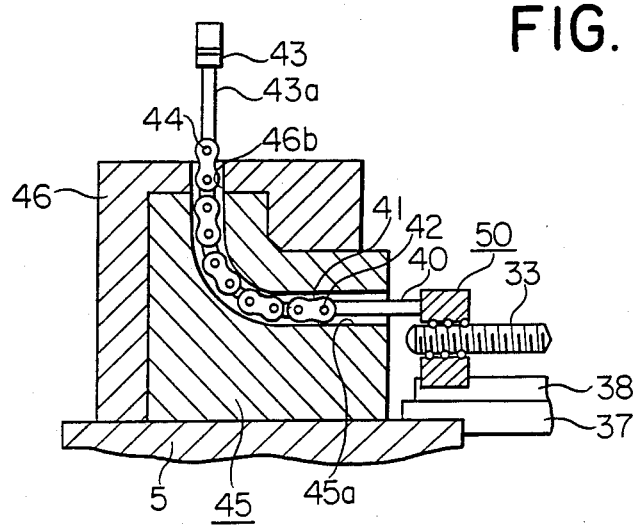
FIG. 4 is a longitudinal cross-sectional view of a portion of the embodiment of FIG. 2, illustrating how the roller chain extends from the upper mold when the nut assembly is at one end of its travel.

A number of preferred embodiments of a sealing apparatus in accordance with the present invention will now be described while referring to the accompanying drawings, FIGS. 2-4 of which illustrate a first embodiment. As shown in FIG. 2, a lower mold comprising a generally L-shaped inner lower mold 45 and an outer lower mold 46 is secured to the upper surface of a movable platen 5. The inner surface of the outer lower mold 46 has a shape which is complementary to that of the outer surface of the inner lower mold 45 and is secured thereto. The upper surface of the outer lower mold 46 has an unillustrated mold cavity formed therein inside of which a semiconductor element is disposed during molding. The inner lower mold 45 has a smooth, generally arcuate passageway 45a formed in the center thereof, the passageway 45a extending from the lower end of the mold 45 to the top surface thereof. The upper end of the passageway 45a communicates with a connecting hole 46b in the outer lower mold 46 whose axis is aligned with that of the passageway 45a. The connecting hole 46b communicates with the inside of the mold cavity of the outer lower mold 46 via a cylinder bore 46a which is formed in the outer lower mold 46 and is coaxial with respect to the connecting hole 46b. The inner lower mold 45 serves as a guide for a flexible transmission member in the form of a roller chain 41 which is slidably disposed within the passageway 45a. The top surface of the outer lower mold 46 can be brought into contact with an unillustrated upper mold by raising the movable platen 5 by suitable means. The upper mold likewise has a mold cavity therein which together with the mold cavity of the outer lower mold 46 surrounds the semiconductor element being molded.

The movable platen 5 rigidly supports a base 20 which is secured thereto by bolts 21. The base 20 supports a reciprocating mechanism comprising elements numbers 22-33 and 50. Element number 22 of the reciprocating mechanism is a servomotor which is secured to one end of the base 20. The servomotor 22 has a drive shaft 22a to which is secured a drive pulley 23. The drive pulley 23 drives a follower pulley 25 by means of a drive belt 24, the follower pulley 25 being rotatably supported by a gear box 28 which is secured to the base 20. A first gear 26 is coaxially connected to the follower pulley 25 so as to rotate therewith, and it meshes with a second gear 27 which is rigidly mounted on a rotating shaft 29 which is rotatably supported by ball bearings 30 and 31 which are disposed in opposite walls of the gear box 28. The rotating shaft 29 is rigidly secured to the unthreaded end of a ball screw 33 by a coupling 32. The midportion of the ball screw 33 is rotatably supported by ball bearings 35 which are mounted in a bearing box 34 having a cover 36 secured thereto with bolts. The bearing box 34 is secured to a base 37 which in turn is secured to the upper surface of base 20. Base 37 has a guide rail 38 formed on the upper surface thereof. The guide rail 38 engages with a groove in the bottom surface of a nut assembly 50 which is engaged with the ball screw 33.

The nut assembly 50 is connected by a connecting bar 40 to the above-mentioned flexible transmission member, i.e., the roller chain 41 which is disposed in the passageway 45a in the inner lower mold 45. One end of the connecting bar 40 is detachably connected to the nut assembly 50, while the other end thereof is detachably connected to the roller chain 41 by a pin 42, which enables the last link of the roller chain 41 to pivot about the end of the connecting bar 40. The other end of the roller chain 41 is detachably and pivotably connected to the shaft 43a of a plunger 43 by a pin 44. The head of the plunger 43 is slidably disposed within the cylinder bore 46a formed in the outer lower mold 46, while the shaft 43a thereof extends through the connecting hole 46b into the passageway 45a of the inner lower mold 45.

In order to make it easy to remove the roller chain 41 and the plunger 43 from the inner and outer lower molds, the lengths of the connecting bar 40 and the roller chain 41 are preferably chosen such that when the nut assembly 50 is at one or the other end of its travel along the ball screw 33, at least one end of the roller chain 41 extends outside of the inner lower mold 45 or the outer lower mold 46 so as that the roller chain 41 can be disconnected from the connecting bar 40 or from the plunger 43. For example, FIG. 2 shows the case in which pin 42 which connects the roller chain 41 to the connecting bar 40 extends to the outside of the inner lower mold 45 when the nut assembly 50 is as near as possible to the bearing box 34. Pin 42 can therefore be easily removed and the plunger 43 and the roller chain 41 can be withdrawn via the cylinder bore 46a. Alternatively, as shown in FIG. 4, the lengths can be chosen such that when the nut assembly 50 is at the extreme end of its travel towards the lowr molds 45 and 46, pin 44 extends outside of the upper surface of the outer lower mold 46. By removing pin 44, the plunger 43 can be separated from the roller chain 43 and removed from the molds 45 and 46 through the cylinder bore 46a. Even more preferably, the lengths of the connecting bar 40 and the roller chain 41 are chosen such that pin 44 extends to the outside of the outer lower mold 46 when the nut assembly 50 is at one end of its travel, and pin 42 extends from the inner lower mold 45 when the nut assembly 50 is at the other end of its travel. Selecting the dimensions of the connecting bar 40 and the roller chain 41 in this manner makes it extremely easy to replace the roller chain 41 and the plunger 43 without having to disassemble other parts.

The operation of the embodiment illustrated in FIG. 2 is as follows. A resin pellet 16 is placed atop the plunger 43 as shown in FIG. 2, and a semiconductor element to be sealed in the resin is disposed within the unillustrated mold cavity of the outer lower mold 46. The lower molds 45 and 46 are then raised by the platen 5 until the upper surface of the outer lower mold 46 contacts an unillustrated upper mold. The servomotor 22 is then rotated, and the rotation thereof is transmitted to the ball screw 33 by the drive pulley 23, the drive belt 24, the driven pulley 25, the firt gear 26, the second gear 27, and the rotating shaft 29. As the nut assembly 50 is prevented from rotating by the guide rail 38, the rotation of the ball screw 33 causes the nut assembly 50 to advance towards the free end of the ball screw 33 as it is guided by the guide rail 38. As it advances, it transmits compressive force to the plunger 43 through the connecting bar 40 and the roller chain 41. As a result, the plunger 43 is forced upwards and the resin pellet 16 is injected into the mold cavities of the outer lower mold and the upper mold. The resin pellet 16 is caused to set by unillustrated heaters which are embedded in the molds, and the unillustrated semiconductor element is sealed within the resin.

As the reciprocating movement of the reciprocating mechanism is transmitted to the plunger 43 by a flexible transmission member in the form of a roller chain 41, the direction of movement of the reciprocating mechanism with respect to the plunger 43 and the disposition of the reciprocating mechanism can be freely chosen so as to make optimal use of empty space within the apparatus. As a result, the apparatus can be made extremely compact in comparison with a conventional sealing apparatus. Furthermore, as the roller chain 41 can be disconnected from the connecting bar 40 and the plunger 43 by simply removing the pins 42 and 44, the roller chain 41 and the plunger 43 can be easily removed from the apparatus for repair or replacement without it being necessary to disassemble other portions of the apparatus.

In addition, the same plunger 43 and reciprocating mechanism can be used with lower molds of various sizes simply by replacing the roller chain 41 with one of a different length. It is also possible to perform the sealing of different types of semiconductor elements by merely replacing the outer lower mold 46 and the upper mold with ones having different shapes, using the other portions of the apparatus without alterations.

As mentioned previously, at the time of molding, in order to make the resin pellet 16 set within the molds, the pellet 16 is heated by unillustrated heaters which are embedded within the upper and lower molds. As a result, the inner and outer lower molds 45 and 46 are heated to a high temperature which is generally on the order of 180° C.

Furthermore, as the presence of lubricating oil within the molds can ruin the semiconductor which is being sealed, it is not possible to lubricate the passageway 45a in which the roller chain 41 reciproctes, the cylinder bore 46a for the plunger 43, or the hole 46b for the plunger shaft 43a.

Thus, on account of the heat and the lack of lubrication, the inner surfaces of the inner and outer lower molds 45 and 46 are subject to wear and require periodic replacement. However, the replacement of the entirety of the inner and outer lower molds 45 and 46 of FIG. 2 is expensive. Therefore, in a second embodiment of the present invention, replaceable linings which can be inexpensively replaced when worn are provided in a passageway for a roller chain and a cylinder bore for a plunger. This second embodiment is illustrated in FIGS. 5–9. As shown in the figures, in this embodiment, a movable platen 5 has a hollow mold support 68 secured to its upper surface by bolts 68a. A lower mold 69 having a cylinder bore 69a formed in the center thereof is secured to the top surface of the mold support 68. A replaceable, cylindrical lining 70, at least the surface of which is preferably made of a heat-resistant material such as a ceramic material, tightly fits into the cylinder bore 69a, and a plunger 43 is slidably disposed within the lining 70. The mold support 68 houses two generally L-shaped guide blocks 60a and 60b which are secured to the base of the mold support 68 by bolts 62 and are secured to one another by bolts 61. The confronting surfaces of the guide blocks 60a and 60b have a C-shaped channel 60c and a hat-shaped channel 60d, respectively, formed therein. The channels 60c and 60d extend along the entire length of the blocks 60a and 60b and form a passageway for a roller chain 41. The hat-shaped channel 60d houses an upper lining 63 and a lower lining 64 which are secured to guide block 60b by bolts 65. The confronting surfaces of the upper lining 63 and the lower lining 64 are smooth and have a generally arcuate longitudinal cross-sectional profile. They are separated from one another by a uniform gap in which the rollers 41b of the roller chain 41 are disposed. One link of the roller chain 41 is illustrated in FIG. 7. As shown in FIG. 6, the link plates 41a and the rollers 41b of the roller chain 41 are rotatably mounted on pins 41c. The link plates 41a are restrained from lateral movement on the pins 41c by a snap ring 41d and a washer 41e which are disposed on the endof each pin 41c. The link plates 41a on one side of the roller chain 41 are housed in the middle portion of the hat-shaped channel 60d, while the link plates 41a on the other side of the chain 41 are housed in the C-shaped channel 60c in the other block 60a.

As in the previous embodiment, a base 20 for a reciprocating mechanism is secured to the movable platen 5 by bolts 21. The outer end of the base 20 has a gear box 28 integrally formed thereon. The gear box has a cover 28a which is secured to the body of the gear box 28 by nuts 28b. In contrast to the previous embodiment, a servomotor 22 is mounted directly on the cover 28a, and a first gear 26 is secured directly to the drive shaft 22a of the servomotor 22, which extends through the cover 28a. The first gear 26 meshes with a second gear 27 which is secured to a rotating shaft 29, the rotating shaft 29 being rotatably supported by ball bearings 30 and 31 which are mounted in one of the walls and the cover 28a, respectively, of the gear box 28. The rotating shaft 29 is coaxially secured to the unthreaded portion of a ball screw 33 by a coupling 32. The ball screw 33 engages with a nut assembly 50 which is guided by a guide rail 38, the guide rail 38 being secured to the base 20 by nuts 39. The nut assembly 50 is detachably connected to a connecting bar 40 in the same manner as in the previous embodiment.

Various materials can be used for the upper and lower linings 63 and 64, but a ceramic material is particularly suitable because it has good wear resistance in the absence of lubrication in addition to good heat resistance. The linings can be made entirely of a ceramic material, or as shown in FIG. 8, they can have a thin ceramic layer 63a and 64a formed on the inner surfaces thereof, while the other portions of the lining are made of some other suitable material.

The wear resistance of the apparatus can be further increased if the roller chain 41 is covered with a ceramic material or if it is formed entirely of a ceramic material.

FIG. 9 illustrates the structure of the nut assembly 50 in detail. The nut assembly 50 has a generally L-shaped nut 51 which engages with the ball screw 33. The nut 51 is rigidly secured to the upper surface of a sliding base 52 by screws 53. The sliding base 52 is slidably mounted on the guide rail 38. The nut assembly 50 is detachably connected to the connecting bar 40 by means of a connecting plate 54 which is secured to the top surface of the nut 51 by nuts 55. The connecting plate 54 has a T-shaped mortise 54a formed in the end which is nearest the guide blocks 60a and 60b, and the connecting bar 40 has a T-shaped tenon 40a which is formed on one end and which fits into the mortise 54a. The open lower ends of the guide blocks 60a and 60b are covered by two cover plates 66 which are secured to the guide blocks by bolts 67. The connecting bar 40 passes through rectangular holes which are formed in the center of both cover plates 66. As is also shown in the figure, the ball screw 33 has a key 33a formed on the unthreaded end thereof by which it is secured to the coupling 32. With this structure, the connecting bar 40 can be easily connected and disconnected from the nut assembly 50, making it simple to disassemble the apparatus when it is necessary to exchange or repair parts.

Figure 5:
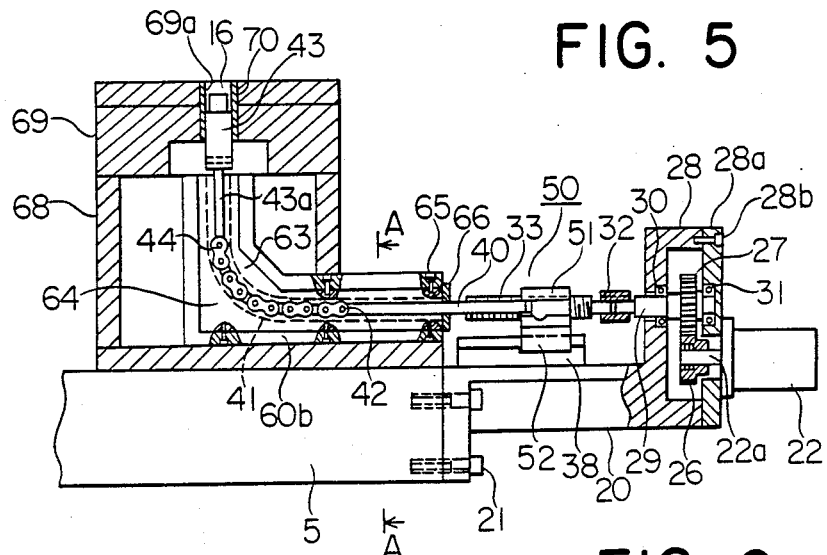
FIG. 5 is a longitudinal cross-sectional view of a portion of a second embodiment of a sealing apparatus in accordance with the present invention.
Figure 6:
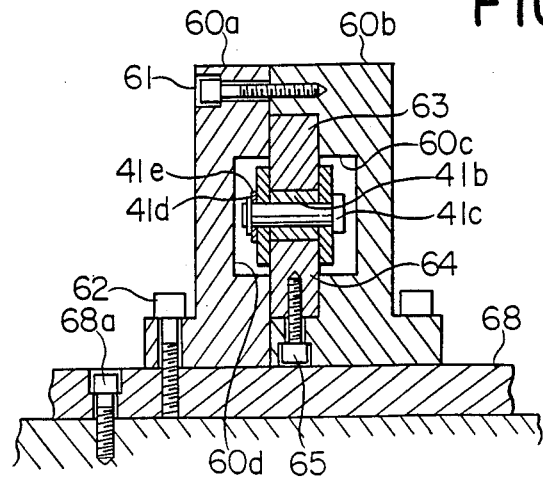
FIG. 6 is a transverse cross-sectional view of Section A—A of FIG. 5.

The operation of the embodiment of FIG. 5 is identical to that of the embodiment of FIG. 2. In addition to the benefits provided by the first embodiment, it has the advantage that when the cylinder lining 70 or linings 63 and 64 for the passageway become worn, they can be inexpensively replaced. Furthermore, if at least the surfaces of the linings are made of a ceramic material, they can provide excellent heat and wear resistance. As the guide blocks 60a and 60b which hold the linings 63 and 64 can be easily separated from one another by removing the bolts 61 and 62, the linings 63 and 64 can be easily removed and installed. Since the guide blocks 60a and 60b are separate members, the channels 60c and 60d can be easily and inexpensively formed therein by methods such as electrical discharge machining or milling. Furthermore, if it is desired to use a roller chain 41 having different dimensions, it is only necessary to replace the linings 63 and 64, and the other portions of the apparatus can be used without alterations.

Figure 10:
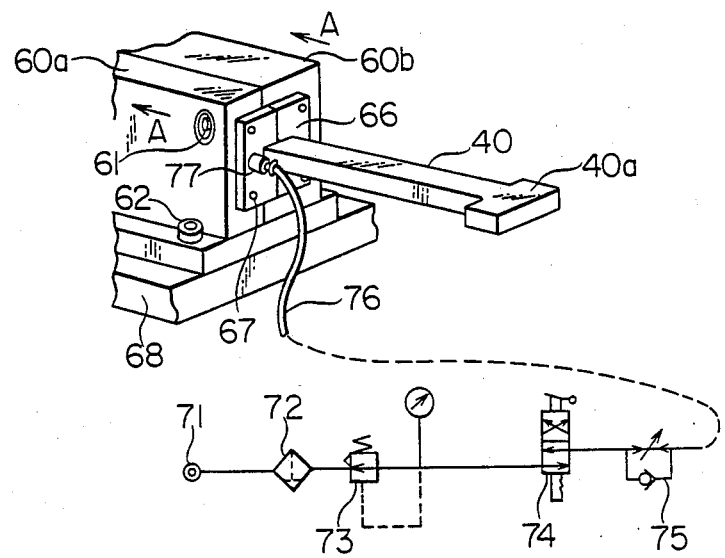
FIG. 10 is a perspective view of a portion of a third embodiment of a sealing apparatus in accordance with the present invention.

Due to the heating of the lower mold during molding, the roller chain 41 is also heated to a high temperature, and this heating can greatly shorten the life-span thereof. In a third embodiment of the present invention, this undesirable heating of the roller chain is prevented by the provision of a ventilating mechanism for passing cooling air through the passageway for the roller chain 41. A portion of this embodiment is illustrated in FIG. 10. The ventilating mechanism comprises elements numbers 71 through 77. A pressure regulator 73 is connected to the outlet 71 of an unillustrated compressed air supply through an air filter 72 which filters the compressed air. The pressure regulator 73 maintains a constant pressure downstream thereof. A solenoid valve 74 is connected to the downstream side of the pressure regulator 74, and a flow rate controller 75 which controls the air flow rate is connected to the downstream side of the solenoid valve 74. The air which passes through the flow rate controller 75 enters into two guide blocks 60a and 60b like those shown in FIG. 6 via a hose 76 which is secured to a connector 77. The connector 77 is secured to one of two end plates 66 which cover the open end of the guide blocks 60a and 60b, and it communicates with a passageway for a roller chain 41 which is formed inside the guide blocks 60a and 60b. The structure of this embodiment is otherwise identical to that of the embodiment of FIG. 5.

When a resin tablet 16 is injected into the mold cavities of the upper and lower molds of the apparatus and then heated in order to make it set, the ventilation mechanism passes cooling air through the passageway formed in the guide blocks 60a and 60b for the roller chain 41. After passing along the entire length of the passageway, the cooling air passes through the cylinder bore 69a formed in the lower mold 69 and exits from the molds. As a result, the roller chain 41 is prevented from being heated to a high temperature, and the life-span thereof can be greatly lengthened. The operation of this embodiment is otherwise identical to that of the previous embodiment, and the same advantages are obtained.

In the embodiment of FIG. 10, the cooling air exits from the appartus after passing through the cylinder bore 69a. However, as the purpose of the cooling air is to cool the roller chain 41, the cooling air may be made to exit from the apparatus at a location between the upper end of the roller chain 41 and the cylinder bore 69a with the same effects by the provision of a suitable air passageway.

Figure 14:
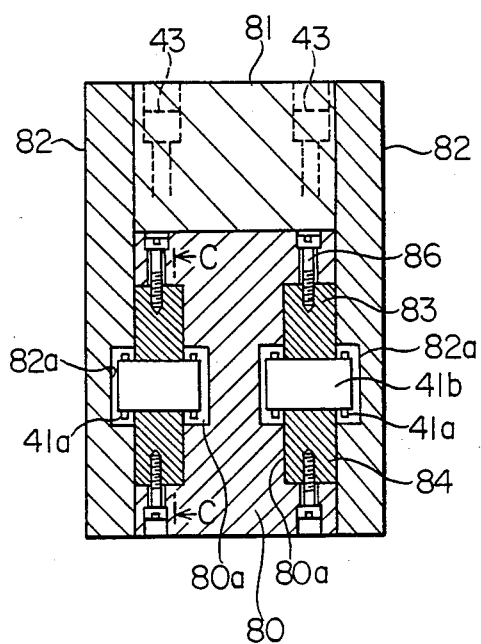
FIG. 14 is a transverse cross-sectional view of Section B—B of FIG. 11.
Figure 15:
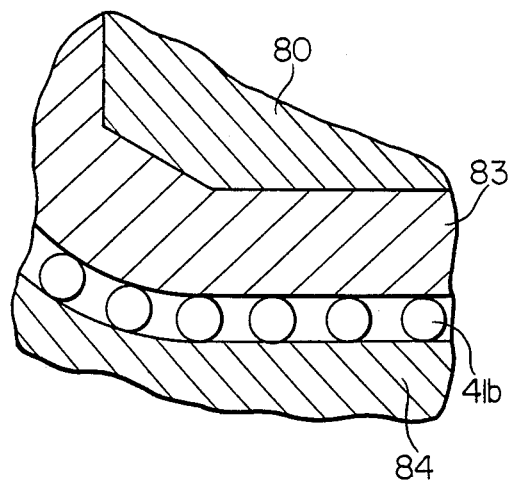
FIG. 15 is a longitudinal cross-sectional view of Section C—C of FIG. 14.

Each of the previous embodiments of a sealing apparatus according to the present invention has only a single plunger 43, but it is possible for the apparatus to have any number of plungers so as to simultaneously seal a plurality of semiconductor elements. FIGS. 11–15 illustrate a fourth embodiment of the present invention which has two plungers 43 which can be simultaneously operated. In this embodiment, an inner lower mold 80 and an outer lower mold 81 which fits over the inner lower mold 80 are secured to one another and to a movable platen 5. As shown in FIG. 14, the inner lower mold 80 has identical hat-shaped channels 80a formed in opposite sides thereof, the channels 80a extending for the entire length of the inner lower mold 80 from the lower end to the upper end thereof.

The opposite sides of the inner lower mold 80 are covered by a pair of side plates 82 which are detachably secured thereto by bolts or other suitable connecting members. Each of the side plates 82 has a longitudinally-extending C-shaped channel 82a formed therein which confronts and is parallel to one of the hat-shaped channels 80b formed in the inner lower mold 80. The hat-shaped channels 80a and the C-shaped channels 82a together form two parallel passageways 85 in which two identical roller chains 41 are disposed.

The upper portions of the hat-shaped channels 80a house a pair of upper linings 83, and the lower portions of the channels 80a house a pair of lower linings 84 which are secured to the inner lower mold 80 by screws 86. The confronting surfaces of the upper linings 83 and the lower linings 84 are separated by a constant gap in which the rollers 41b of the roller chains 41 are disposed. The link plates 41a on one side of each roller chain 41 are disposed in the middle portion of one of the hat-shaped channels 80a, and the link plates 41a on the other side of each roller chain 41 are housed within the C-shaped channels 82a formed in the side plates 82. As in the previous embodiment, at least the inner surfaces of the linings 83 and 84 are preferably made of a ceramic material.

The outer lower mold 81 has two parallel cylinder bores 81a formed in the upper surface thereof, and each of the cylinder bores 81a communicates with the inside of one of the passageways 85 in the inner lower mold 80 via a connecting hole 81b having a smaller diameter than the cylinder bores 81b. A plunger 43 is slidably disposed in each of the cylinder bores 81a, with the shaft 43a thereof extending through the connecting hole 81b into the corresponding passageway 85. The lower end of each plunger shaft 43a is pivotably connected to the upper end of one of the roller chains 41 by a removable pin 44. Although not shown in FIG. 11, a replaceable cylinder lining may be inserted into each of the cylinders bores 81a as in the embodiment of FIG. 5.

As in the previous embodiments, a base 20 which supports a reciprocating mechanism is secured to the movable platen 5 by bolts 21. A single servomotor 22 is securd to the base 20, and a drive pulley 23 is secured to the drive shaft 22a of the servomotor 22. A first driven pulley 25a is rotatably supported by a gear box 28 which is secured to the base 20, and the first driven pulley 25a is driven by the drive pulley 23 by means of a drive belt 24a. A second driven pulley 25b which is also rotatably supported by the gear box 28 is driven by the first driven pulley 25a through another drive belt 24b. The first and second driven pulleys 25a and 25b are connected to a pair of first gears 26a and 26b, respectively, so as to rotate therewith. The first gears 26a and 26b mesh with two second gears 27a and 27b, respectively, which are secured to two parallel rotating shafts 29 which are rottably supported by ball bearings 30 and 31 which are mounted in the walls of the gear box 28. Each of the rotating shafts 29 is connected to the unthreaded end of one of two parallel ball screws 33 by a coupling 32. Each of the ball screws 33 is rotatably supported by a ball bearing 35 which is housed in a bearing box 34. Each bearing box is secured to one of two bases 37 which are secured to the top of base 20. Two nut assemblies 50 having the same structure as that illustrated in FIG. 9 are each engaged with one of the ball screws 33, and are each slidably supported by a longitudinally-extending guide rail 38 which is secured to the base 37. Each nut assembly 50 is connected to the lower end of one of the roller chains 41 by a connecting bar 40 and a removable pin 42 in the same manner as in the previous embodiments.

The operation of this embodiment is basically the same as that of the previous embodiments. When the servomotor 22 is rotated, both of the rotating shafts 29 are made to simultaneously rotate in the same direction, the rotation of the rotating shafts 29 is transmitted to the ball screws 33, and the nut assemblies 50 are together driven along the ball screws 33 towards the inner lower mold 80. As a result, both plungers 43 are simultaneously forced upwards, and two resin tablets 16 are injected into an unillustrated upper mold to simultaneously seal two semiconductor elements. The same advantages as in the previous embodiments are obtained.

Figure 11:
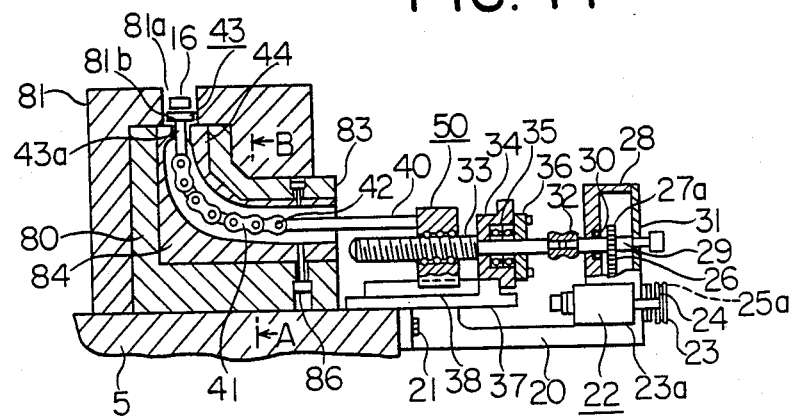
FIG. 11 is a longitudinal cross-sectional view of a portion of a fourth embodiment of the present invention.
Figure 12:
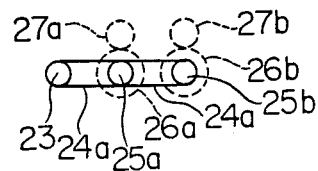
FIG. 12 is a schematic view of a portion of the reciprocating mechanism of the embodiment of FIG. 11.
Figure 13:
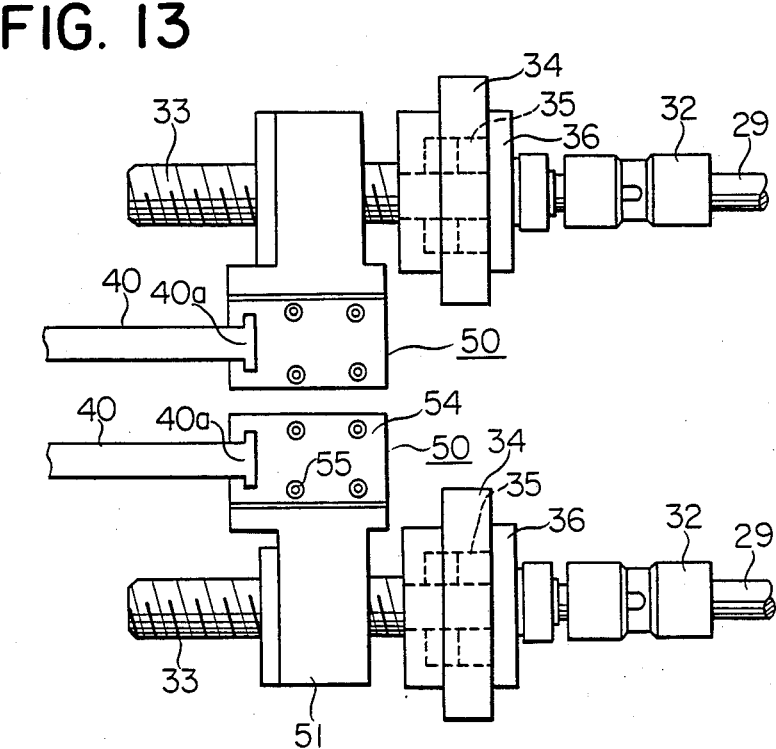
FIG. 13 is a plan view of the nut assemblies of the embodiment of FIG. 11.

Although not shown in FIG. 11, a ventilating mechanism like that illustrated in FIG. 10 can also be applied to this embodiment so as to cool both of the roller chains 41 and prolong their life-span.

In each of the previous embodiments, the plunger 43 is made to reciprocate at right angles with respect to the direction of movement of a nut assembly 50, but as the roller chain 41 can be bent as desired, there is no restriction on the directions of their relative movement.

Furthermore, although the above-described embodiments employ one or two plungers 43, there is no restriction on the number which are used.

In addition, various means other than a roller chain, such as a flexible wire, can be used as a flexible transmission member for connecting a plunger and a reciprocating mechanism.

Also, a reciprocating mechanism for causing a plunger to reciprocate is not restricted to the ball screw mechanism of the above-described embodiments.

What is claimed is:

1. A sealing apparatus for sealing a semiconductor element in a resin, comprising:
   a first mold having a mold cavity for housing a semiconductor element formed in one face thereof and a cylinder bore formed therein which communicates with the inside of said mold cavity;
   a second mold having a mold cavity formed in one face thereof which confronts said face of said first mold;
   means for joining said first mold and said second mold such that said one face of said first mold contacts said one face of said second mold and said mold cavities in said first mold and said second mold together surround said semiconductor element;

a plunger which is slidably disposed in said cylinder bore of said first mold;

reciprocating means for making said plunger reciprocate within said cylinder bore towards and away from said second mold; and a flexible transmission member which is connected between said plunger and said reciprocating means and which is capable of transmitting compressive and tensile forces from said reciprocating means to said plunger.

2. A sealing apparatus as claimed in claim 1, further comprising guide means for guiding said flexible transmission member along a curved path between said plunger and said reciprocating means.

3. A sealing apparatus as claimed in claim 2, wherein one end of said flexible transmission member is pivotably connected to said plunger by a first removable pin, and the other end of said flexible transmission member is pivotably connected to said reciprocating means by a second removable pin.

4. A sealing apparatus as claimed in claim 3, wherein said first removable pin extends to the outside of said first mold when said plunger is moved by said reciprocating means as far as possible towards said second mold.

5. A sealing apparatus as claimed in claim 3, wherein said second removable pin extends to the outside of said guide means when said plunger is moved by said reciprocating means as far as possible in the direction away from said second mold.

6. A sealing apparatus as claimed in claim 3, wherein said first removable pin extends to the outside of said first mold when said plunger is moved by said reciprocating means as far as possible towards said second mold and said second removable pin extends to the outside of said guide means when said plunger in moved by said reciprocating means as far as possible in the direction away from said second mold.

7. A sealing apparatus as claimed in claim 2, wherein said guide means comprises a block-shaped member having a smoothly curving longitudinally-extending passageway formed therein, said flexible transmission member being disposed within said passageway.

8. A sealing apparatus as claimed in claim 7, wherein said block-shaped member is longitudinally divided into two confronting sections which are detachably secured to one another, the confronting surfaces thereof forming the sides of said passageway.

9. A sealing apparatus as claimed in claim 8, wherein said guide means further comprises a pair of confronting linings which are detachably secured to the inside of said passageway along the length thereof on opposite sides of said flexible transmission member.

10. A sealing apparatus as claimed in claim 9, wherein at least the confronting surfaces of said linings are made of a ceramic material.

11. A sealing apparatus as claimed in claim 1, further comprising a cylindrical lining which tightly fits into said cylinder bore in said first mold.

13. A sealing apparatus as claimed in claim 2, wherein: wherein at least the inner surface of said cylindrical lining is made of a ceramic material.

13. A ealing apparatus as claimed in claim 2, wherein:

said first mold has two sets of mold cavities and two cylinder bores formed therein, a plunger being slidably disposed in each of said cylinder bores; and said guide means has two parallel passageways formed therein, each of said passageways having a separate flexible transmission member disposed therein, one end of each of said flexible transmission members being connected to one of said plungers and the other end of each of said flexible transmission members being connected to said reciprocating means.

14. A sealing apparatus as claimed in claim 13, wherein said guide means comprises a block-shaped member which is longitudinally-divided into a central portion and two side plates which are detachably secured to the opposite sides of said central portion, said central portion and one of said side plates forming the sides of one of said passageways and said central portion and the other of said side plates forming the sides of the other of said passageways.

15. A sealing apparatus as claimed in claim 14, wherein said guide means further comprises a first pair of confronting linings which are detachably secured to the inside of one of said passageways along the length thereof on opposite sides of one of said flexible transmission members and a second pair of confronting linings which are detachably secured to the inside of the other of said passageways along the length thereof on opposite sides of the other of said flexible transmission members.

16. A sealing apparatus as claimed in claim 15, wherein at least the confronting surfaces of said linings are made of a ceramic material.

17. A sealing apparatus as claimed in claim 1, wherein said reciprocating means comprises a ball screw, a servomotor which is drivingly connected to said ball screw, a nut which engages with said ball screw, and a guide rail which extends parallel to said ball screw and is slidably engaged with said nut so as to prevent said nut from rotating on said ball screw while enabling it to translate in the longitudinal direction thereof.

18. A sealing apparatus as claimed in claim 1, further comprising a connecting member which is detachably connected between said flexbiel transmission member and said reciprocating means.

19. A sealing apparatus as claimed in claim 1, further comprising ventilating means for passing cooling air along the length of said flexible transmission member during molding.

* * * * *